United States Patent
Hasselaar et al.

(10) Patent No.: US 8,017,814 B2
(45) Date of Patent: Sep. 13, 2011

(54) PROCESS FOR THE PREPARATION OF POLYETHER POLYOLS

(75) Inventors: Melis Hasselaar, Ridderkerk (NL); Parminder Singh Sangha, Amsterdam (NL); Andreas Wilhelmus De Winter, Amsterdam (NL)

(73) Assignee: Shell Oil Company, Houston, TX (US)

( * ) Notice: Subject to any disclaimer, the term of this patent is extended or adjusted under 35 U.S.C. 154(b) by 46 days.

(21) Appl. No.: 12/364,605

(22) Filed: Feb. 3, 2009

(65) Prior Publication Data

US 2009/0143625 A1    Jun. 4, 2009

Related U.S. Application Data

(63) Continuation-in-part of application No. 10/276,290, filed on Feb. 19, 2003, now abandoned.

(51) Int. Cl.
*C07C 41/03* (2006.01)

(52) U.S. Cl. ........ 568/620; 568/621; 568/623; 568/624; 568/679

(58) Field of Classification Search .................. None
See application file for complete search history.

(56) References Cited

U.S. PATENT DOCUMENTS

| | | | |
|---|---|---|---|
| 3,016,404 A | 1/1962 | Beauchamp et al. | 260/615 |
| 3,299,151 A | 1/1967 | Wismer et al. | 568/621 |
| 3,341,599 A * | 9/1967 | Bormann et al. | 564/497 |
| 4,306,943 A | 12/1981 | Mori et al. | 203/29 |
| 4,507,475 A | 3/1985 | Straehle et al. | 536/120 |
| 4,996,310 A | 2/1991 | Acosta | 536/120 |
| 5,069,817 A * | 12/1991 | Schmid et al. | 516/9 |
| 6,103,850 A | 8/2000 | Reichel et al. | 528/60 |

FOREIGN PATENT DOCUMENTS

| | | |
|---|---|---|
| DE | 19519680 | 12/1996 |
| EP | 0641814 | 9/1994 |
| GB | 916552 | 3/1961 |
| WO | WO9623019 | 8/1996 |

* cited by examiner

*Primary Examiner* — Rosalynd Keys

(57) ABSTRACT

A process for the preparation of a polyether polyol containing at most about 15 ppm of sodium and potassium, comprising: (a) reacting an initiator having at least two active hydrogen atoms with at least one alkylene oxide in the presence of a catalyst having an alkali metal hydroxide to form a polyether polyol reaction product; (b) neutralizing the polyether polyol reaction product obtained in step (a) by contacting this reaction product with phosphoric acid and water; and (c) removing the salt crystals from the polyether polyol and recovering the neutralized polyether polyol containing at most about 15 ppm of sodium and potassium, wherein no adsorption agent and no hydrate of a metal salt of the acid are used before, during or after the neutralization.

6 Claims, No Drawings

PROCESS FOR THE PREPARATION OF POLYETHER POLYOLS

This application is a continuation-in-part of prior application Ser. No. 10/276290, filed Feb. 19, 2003 now abandoned, which is hereby incorporated by reference.

FIELD OF THE INVENTION

The present invention relates to a process for the preparation of polyether polyols.

BACKGROUND OF THE INVENTION

Methods for preparing polyether polyols, also sometimes referred to as poly(oxyalkylene) polyols, are well known in the art. Typically, such methods involve reacting a starting compound having a plurality of active hydrogen atoms with one or more alkylene oxides, such as ethylene oxide, propylene oxide, butylene oxide or mixtures of two or more of these. Suitable starting compounds include polyfunctional alcohols, generally containing 2 to 6 hydroxyl groups. Examples of such alcohols are glycol, such as diethylene glycol, dipropylene glycol, glycerol, di- and polyglycerols, pentaerythritol, trimethylolpropane, triethanolamine, sorbitol, sucrose, mannitol, etc. Usually a strong base like an alkali metal hydroxide (typically potassium hydroxide, cesium hydroxide or sodium hydroxide) is used as a catalyst in this type of reaction.

When the polymerization reaction is finished, the alkali metal has to be removed from the polymerization product (neutralization). Several ways for achieving this are known in the art. For instance, removal of the alkali metal ions by ion exchange can be applied. However, additional solvent is needed to reduce the viscosity of the polyol product sufficiently to enable an effective ion exchange. The use of such additional solvent introduces the risk of leakage, which is undesired from an environmental viewpoint, and moreover the method is expensive while the costs are even further increased by regeneration facilities in order to enable a solvent recycle. Another method to remove alkali metal from the polyether polyol product is by using absorbents like magnesium silicate. The disadvantages of this method are the high cost and the high amount of solid waste created.

U.S. Pat. No. 4,306,943 relates to a process for the preparation of polyether polyols in which the polyether polyols are neutralised by adding to the crude polyether polyol a mineral acid having a dissociation constant of greater than $10^{-3}$ at 25° C. and from 0.01 to 0.3% wt, based on the weight of crude polyether polyol, of a hydrate of a metal salt of said mineral acid for promoting the crystal growth of salt formed from the alkaline catalyst by the neutralization. Subsequently, water is distilled off from the liquid and the remaining liquid is filtered. The process of the present invention makes it obsolete to add solids such as a hydrate of a metal salt of the mineral acid used in the neutralisation. As no information is given on the amount of polyether polyol used in Control Example 2 of U.S. Pat. No. 4,306,943, it is unclear what relative amounts of water are added.

U.S. Pat. No. 4,507,475 teaches to add during neutralization 0.2 to 1.5 parts by weight of water per 100 parts by weight of crude polyether polyol and 0.3 to 1.1 moles of orthophosphoric acid per mole of basic catalyst in combination with from 0.05 to 0.5 parts by weight of magnesium silicate as adsorption agent per 100 parts by weight of crude polyether polyol. After salts and the incorporated solid additives are separated, water is removed by stripping. Contrary to what is taught in the comparative examples of U.S. Pat. No. 4,507,475, it has now been found that it is possible to prepare polyether polyols containing 20 ppm or less of sodium and potassium, without the help of adsorption agent.

DE-A-19519680 relates to a process for preparing catalytically active polyether polyols by base catalysed conversion of hydrogen containing starting compounds with alkylene oxides under conventional conditions, which process comprises either staged addition of catalyst comprising basic compounds and organic and/or inorganic alkali and/or alkaline earth salts and/or catalyst removal by a special method for crystal forming and crystal removal by addition of acids and removal of the salt crystals thereof before the crystal forming phase and/or crystal conversion phase has ended. In Example 4 according to the teaching, the salt crystals are removed when the potassium concentration of the polyether polyol is 115 ppm. The aim of the present invention is to obtain polyether polyol containing at most 20 ppm of sodium and potassium. DE-A-19519680 contains no teaching on how to obtain polyether polyols having a low sodium and/or potassium content.

A commonly used neutralisation method involves the addition of a concentrated aqueous acid solution and water to the polyether polyol reaction product in a neutralisation vessel. Typically up to 10% by weight of water based on polyether polyol is added. The acid forms salts with the alkali metal ions which salts initially dissolve in the water. The water is subsequently evaporated by heating the water/polyol mixture until salt crystals are formed and suspend in the liquid medium consisting predominantly of polyether polyol. Once the water content in the polyol has decreased to a sufficiently low level, the polyol with the salt crystals suspended therein is passed over a filter and the neutralised polyether polyol is recovered.

However, the crystals formed in the above process are relatively large and do not uniformly disperse through the polyol phase. As a result, a large amount of salt crystals adheres to the internals of the neutralisation vessel and forms a salt layer on these internals when the polyol is transferred from the neutralisation vessel to the filtration unit. After each few batches of polyol (e.g. after each second or third batch) the neutralisation vessel then needs to be washed with water to remove the salt crystals precipitated on the internals. The resulting salt solution needs to be disposed of and hence represents a further waste stream. Furthermore, due to the relatively large amount of water used, a large amount of heat is required to evaporate the water from the polyether polyol and it takes a relatively long period of time to decrease the water content to the desired low level.

SUMMARY OF THE INVENTION

The present invention aims to provide a process for the preparation of polyether polyols, wherein the neutralisation of the reaction mixture is optimised both in terms of energy consumption and process time. More particularly, the present invention aims to provide a process for the preparation of polyether polyols, wherein the heat input during the neutralisation is minimised, while the duration of the neutralisation procedure is significantly shortened. Furthermore, the present invention aims to provide a neutralisation procedure which does not lead to significant fouling of the internals of the neutralisation vessel, so that a separate cleaning procedure after each batch is no longer necessary. This also shortens the time needed for neutralising a batch of "raw" polyether polyol (i.e. the polyether polyol reaction product) and hence increases the neutralisation capacity of a single neutralisation vessel. The present invention also aims to provide a more environmentally friendly neutralisation procedure for polyether polyols by minimising the amount of waste streams obtained.

These and other aims were achieved by using an acid and only a small amount of water, suitably combined into a concentrated aqueous acid solution, for neutralising the polyether polyol reaction product.

Accordingly, the present invention relates to a process for the preparation of a polyether polyol containing at most about 15 ppm of sodium and potassium, which process comprises the steps of:
a) reacting an initiator having at least two active hydrogen atoms with at least one alkylene oxide in the presence of a catalyst having an alkali metal hydroxide to form a polyether polyol reaction product;
b) neutralizing the polyether polyol reaction product obtained in step (a) by contacting this reaction product with phosphoric acid and water, wherein the acid and water are added in such amounts that after addition: the water content is less than about 1% by weight on the basis of total weight of polyether polyol present and the molar ratio of acid to alkali metal hydroxide is in the range of from about 0.3 to about 1.0 thereby producing salt crystals; and
c) removing the salt crystals from the polyether polyol and recovering the neutralized polyether polyol containing at most about 15 ppm of sodium and potassium, wherein no adsorption agent and no hydrate of a metal salt of the acid are used before, during or after the neutralization.

DETAILED DESCRIPTION OF THE INVENTION

In the process of the present invention, preferably less than about 0.05 parts by weight per about 100 parts by weight of polyether polyol of adsorbent is added during the neutralization of the process according to the present invention. More preferably, no adsorbent is added during the neutralization of the process according to the present invention. Most preferably, no solids are added before, during or after the neutralization of the process according to the present invention, apart from optional filter aids.

The combined amount of sodium and the amount of potassium, is at most about 15 ppm by weight of the metal in the polyether polyols obtained in the process according to the present invention. More preferably, this amount is most about 10 ppm. Most preferably, the amount is less than about 10 ppm.

In step (a) of the process the polyether polyols are typically prepared by reacting an initiator compound having at least two active hydrogen atoms with at least one alkylene oxide in the presence of an alkali metal hydroxide catalyst at a temperature of from about 80 to about 150° C., more particularly from about 90 to about 130° C. The alkali metal hydroxide used is suitably selected from one or more of potassium hydroxide, cesium hydroxide and sodium hydroxide, but the use of potassium hydroxide is preferred.

The reaction is typically carried out at such a rate that the alkylene oxide is taken up by the reaction mixture in approximately 2 to 30 hours, preferably 3 to 10 hours, at atmospheric pressure. Higher pressures may also be applied, but the pressure will usually not exceed about 20 bar and preferably is from about 1 to about 5 bar. The alkylene oxide may be diluted with inert gas, such as nitrogen, and normally the alkylene oxide is added to the reaction mixture in the course of the reaction. When mixed alkylene oxides are used, such as mixture of propylene oxide and ethylene oxide, random polyether polyols will be formed. Successive addition of different alkylene oxides will result in block copolymeric polyether polyols. Preferred alkylene oxides are propylene oxide and ethylene oxide. A frequently used technique is ethylene oxide tipping; in this technique propylene oxide or a propylene oxide/ethylene oxide mixture is first reacted with an initiator and when the alkoxylation reaction is almost completed pure ethylene oxide is added.

Suitable initiators include the polyfunctional alcohols mentioned in the introductory part of this specification, i.e. glycol, diethylene glycol, dipropylene glycol, glycerol, di- and polyglycerols, pentaerythritol, trimethylolpropane, alkanolamines (e.g. tri-, di- and monoethanolamine), sorbitol, sucrose, mannitol and the like. Alternatively, amines like toluenediamine, 1,6-hexanediamine, ethylenediamine and the like may be used. Mixtures of two or more different initiators may also be used.

The process of the present invention is in principle suitable to prepare any type of poly(oxyalkylene) polyol wherein an alkali hydroxide can be used as catalyst. Typical polyether polyols that can be prepared have a molecular weight of about 150 to about 8000, a nominal average functionality of about 2 to about 8 and a hydroxyl value of about 20 to about 750 mg KOH/g. Accordingly, both flexible and rigid polyether polyols can be prepared. Typically, flexible polyether polyols are used to prepare flexible polyurethane foams and have a molecular weight (number average) of at least about 2000, suitably from about 2500 to about 8000, a nominal average functionality of about 2 to about 4 and a hydroxyl value of about 100 mg KOH/g or less, suitably about 20 to about 80 mg KOH/g. Rigid polyols, which are used to prepare rigid polyurethane foam, normally have a molecular weight up to about 2500, but typically have molecular weights of about 1500 or less, suitably about 1000 or less, more suitably about 800 or less, while the minimum molecular weight normally is about 150, suitably about 200. The nominal average functionality of rigid polyols typically is about 3 or higher, suitably from about 3 to about 8. The hydroxyl value of a rigid polyol typically ranges from about 100 to about 800 mg KOH/g, suitably from about 150 to about 750 mg KOH/g. The present process was found to be particularly suitable for preparing polyether polyols having a number average molecular weight of about 2500 or less.

Nevertheless, the present invention is also useful for preparing polyether polyols having a molecular weight of about 2500 or higher.

In step (b) of the present process the actual neutralisation of the polyether polyol reaction product formed in step (a) takes place by contacting this reaction product with an acid and water. Such contacting suitably takes place in a neutralisation vessel containing heating means, e.g. a heating coil, and stirring means. The actual contacting can be effected by first adding the polyether polyol reaction product to the vessel followed by the acid and water or vice versa. The actual order of addition is immaterial for the present invention. As a result of combining the acid and polyol reaction product, the alkali metal ions of the catalyst which are still present in the polyol reaction product react into a salt with the acid anion.

The acid and water may be added simultaneously as a single aqueous solution of a suitable acid in water, but could also be added consecutively, for instance as a concentrated acid solution plus additional water.

The acid to be used in step (b) in principle may be any water-soluble acid having a pKa less than about 5, preferably of less than about 3. The acid may be an organic or mineral acid. Examples of suitable organic acids are para-toluene sulphonic acid and acetic acid. Examples of suitable mineral acids include sulphuric acid, hydrochloric acid, nitric acid and phosphoric acid. A combination of two or more of different acids may also be used. It has, however, been found particularly useful to use phosphoric acid (H3PO4). Thus, when phosphoric acid is used alkali metal phosphate is the salt formed upon combination of polyol reaction product and acid. The expression "alkali metal phosphate" as used in this connection refers to salts comprising both alkali metal and phosphate and hence include alkali metal dihydrogen phosphate, dialkali metal monohydrogen phosphate and trialkali metal phosphate. Normally, the dihydrogen phosphate will constitute the bulk of the alkali metal phosphate (i.e. about 80 wt % or more).

After addition of the acid and water the water content should be about 1% by weight or less, more preferably about 0.5% by weight or less, on the basis of the total weight of polyether polyol present. If acid and water are added as an aqueous acid solution, this solution should have such acid concentration that the water content remains within the limits set. It is also possible to add a concentrated acid solution together with or followed by some water as long as the water content does not exceed about 2% by weight. A much preferred maximum water content in this connection is about 0.2% by weight. There is no required minimum of water that should be present, but normally the amount of water added with the concentrated acid will not be less that about 0.01% by weight based on the weight of polyol present. Preferably, water and acid are added simultaneously as an aqueous acid solution. In a much preferred embodiment a concentrated acid solution is used, i.e. an aqueous acid solution used comprising at least about 50% by weight, suitably from about 60 to about 90% by weight and more suitably from about 70 to about 85% by weight, of acid having a pKa of less than about 5. Very good results have been obtained when using from about 70 to about 85% by weight phosphoric acid solution in water.

The amount of acid added depends on the amount of alkali metal hydroxide present in the polyether polyol reaction product. The acid solution is used in such amount that the molar ratio of acid to alkali metal hydroxide is in the range of from about 0.3 to about 1.0, preferably from about 0.5 to about 0.95 and more preferably from about 0.7 to about 0.9.

Temperature and pressure are not particularly critical in step (b) and may vary within broad limits. Suitably, step (b) is carried out at a temperature in the range of from about 20 to about 160° C., more suitably from about 70 to about 150° C., and at a pressure of from about 0.1 to about 10 bara, more suitably from about 0.4 to about 5 bara.

Step (c) of the present process is an optional step. If not applied, the reaction mixture obtained in step (b) is directly passed to step (d) wherein the salt crystals formed are removed from the polyether polyol. Especially when the water content of the reaction mixture resulting from step (b) is already very low, i.e. about 1 wt % or less, step (c) is suitably be dispensed with. It is, however, preferred to apply step (c) if the water content of the reaction mixture resulting from step (b) is above 1% by weight and thus to reduce the water content in the reaction mixture resulting from step (b) to less than 1% by weight. In a preferred embodiment of the present invention the water content in the reaction mixture of step (b) is reduced in step (c), provided step (c) is applied, to about 0.5% by weight or less, preferably about 0.2% by weight or less, more preferably about 0.15% by weight or less and most preferably about 0.1% by weight or less, based on total weight of polyether polyol present in said reaction mixture. The water removal is typically effected by evaporating the water from the reaction mixture. To that effect the reaction mixture of step (b) is kept at a sufficiently high temperature for sufficient time to reduce the water content in the reaction mixture to the desired low level. For instance, at atmospheric conditions (1 bara pressure), the temperature should be about 100° C. or higher to effect evaporation of the water. At lower pressures lower temperatures can be applied. Suitably, the water removal is effected at a pressure of from about 0.5 to about 1.5 bara and at a temperature of from about 100 to about 180° C., more suitably from about 105 to about 140° C. If step (b) was carried out at a lower temperature than at which the water removal is effected, then the reaction mixture obtained after step (b) should be heated. This can be conveniently effected by a heating coil in the neutralization vessel. Depending on the desired temperature level hot oil or steam will be passed through such coil, thereby heating the contents of the neutralization vessel and keeping it at the desired temperature.

After the water content has been reduced to a sufficiently low level small salt crystals remain behind in the polyether polyol in dispersed form. In step (d) these crystals are separated from the polyether polyol and this can be achieved by ways known in the art for separating solid particles from a liquid. For example, such separation can be effected by filtration or centrifugation. Alternatively, absorbents like magnesium silicate are used. Filtration, however, is the most preferred technique. After the salt crystals have been removed, the neutralised polyether polyol is recovered.

It is one of the main advantages of the present process that over about 95% by weight of the salt crystals formed is present as small particles in the polyether polyol. It is believed that this is caused by the fact that only a relatively small amount of water needs to be removed (in step (c)). In the prior art method, wherein more water is used and hence more water needs to be removed, the salt crystals have a much more irregular shape and experience has shown that over about 90% by weight of all salt formed remains behind in the neutralization vessel as deposit on the internals (heating coil, stirrer) and inner walls of the vessel. This requires a washing treatment with water after each 2-4 batches resulting in a further industrial waste stream. Such frequent washing treatment is avoided by the present process. This also implies that the number of batches to be neutralized per period of time significantly improves by applying the present process, which is beneficial from an economic perspective.

The invention is further illustrated by the following examples without limiting the scope of the invention to these specific embodiments.

EXAMPLE 1

Preparation of Unneutralised Polyether Polyol

A reactor was charged with 14.5 grams solid KOH (100%) and 1094 grams of glycerol. Subsequently, the temperature was raised to 125° C. This temperature was maintained during 45 minutes at a reduced pressure of 20 mmHg to remove any water present. Subsequently, the temperature was lowered to 115° C. and the addition of propylene oxide was started. The total amount of propylene oxide to be added amounted 6906 grams. After 1 hour 14.9% of all propylene oxide had been added and the reaction pressure inside the reactor had raised to 3.7 bara. The remainder of the propylene oxide was added at such rate that the pressure remained 3.7 bara. After 400 minutes all propylene oxide had been added. After 560 minutes all propylene oxide had reacted and 8000 grams of unneutralised polyol was obtained.

The polyol had a molecular weight of 675, a functionality of 3 and a hydroxyl value of 250 mg KOH/g.

EXAMPLE 2

Neutralisation 7000 grams of the unneutralised polyol obtained in Example 1 was transferred to a 10 liter neutralisation vessel provided with a heating coil at its inside. After all polyol had been transferred into the neutralisation vessel the temperature was raised to 90° C.

Subsequently, 25.3 grams of a 75 wt % solution of phosphoric acid in water was added to the neutralisation vessel at 90° C. and the resulting mixture was stirred for 15 minutes. The water content amounted 0.09 wt % based on polyol. Subsequently, the mixture was heated to 120° C. under atmospheric pressure over a period of one hour. Then, the water content was reduced to 0.05 wt % under reduced pressure (20 mmHg), which took 50 minutes. The product was cooled to 80° C. and filtered through a FUNDABAC filter to remove the finely dispersed salt crystals present therein (FUNDABAC is a trademark). The product obtained contained less than 5 ppm of potassium and no sodium.

Upon inspection of the inside of the neutralisation vessel no deposits were observed on the heating coil, shaft and blades of the stirrer and the inner wall of the vessel. From an analysis of the neutralised polyol it was found that less than 1 wt % of all salts formed had remained behind in the neutralisation vessel.

EXAMPLE 3

Examples 1 and 2 were repeated except that in addition to 25.3 grams of a 75% phosphoric acid solution 4.2 grams of water (water content 0.15 wt % on polyol) were added. The product obtained contained less than 5 ppm of potassium and no sodium.

The water removal under reduced pressure to arrive at a water content of 0.05 wt % now took one hour.

Upon inspection of the inside of the neutralisation vessel no deposits were observed on the heating coil, shaft and blades of the stirrer and the inner wall of the vessel. From an analysis of the neutralised polyol it was found that less than 1 wt % of all salts formed had remained behind in the neutralisation vessel.

EXAMPLE 4

Examples 1 and 2 were repeated except that in addition to 25.3 grams of a 75% phosphoric acid solution 28.9 grams of water (water content 0.5 wt % on polyol) were added. The product obtained contained less than 5 ppm of potassium and no sodium.

The water removal under reduced pressure to arrive at a water content of 0.05 wt % now took 1.5 hours.

Upon inspection of the inside of the neutralisation vessel no deposits were observed on the heating coil, shaft and blades of the stirrer and the inner wall of the vessel. From an analysis of the neutralised polyol it was found that less than 5 wt % of all salts formed had remained behind in the neutralisation vessel.

COMPARATIVE EXAMPLES A AND B

Examples 1 and 2 were repeated except that in addition to 25.3 grams of a 75% phosphoric acid solution in water respectively 173.2 grams of water (water content of 2.5 wt % on polyol; Comparative Example A) and 408.2 grams of water (water content of 5.2 wt % on polyol; Comparative Example B) were added. The products obtained contained less than 5 ppm of potassium and no sodium.

The water removal under reduced pressure to arrive at a water content of 0.05 wt % now took 2.5 hours in case of Comparative Example A and 5 hours in case of Comparative Example B.

Upon inspection of the inside of the neutralisation vessel the inner wall, shaft and blades of the stirrer and heating coil of the neutralisation vessel were coated with crystals in both Comparative Examples. From an analysis of the neutralised polyols obtained in both Comparative Examples it was found that 95 wt % of all salts had deposited on the inside and on the internals of the neutralisation vessel. These salt deposits had to be removed by flushing the neutralisation vessel several times with water.

We claim:

1. A process for the preparation of a polyether polyol containing at most about 15 ppm of sodium and potassium, comprising:
   a) reacting an initiator having at least two active hydrogen atoms with at least one alkylene oxide in the presence of a catalyst having an alkali metal hydroxide to form a polyether polyol reaction product;
   b) neutralizing the polyether polyol reaction product obtained in step (a) by contacting this reaction product with phosphoric acid and water, wherein the acid and water are added in such amounts that after addition: the water content is less than about 0.5% by weight on the basis of total weight of polyether polyol present and the molar ratio of acid to alkali metal hydroxide is in the range of from about 0.3 to about 1.0 thereby producing salt crystals; and
   c) removing the salt crystals produced in (b) from the polyether polyol by filtration or centrifugation and recovering the neutralized polyether polyol containing at most about 15 ppm of sodium and potassium, wherein no adsorption agent and no hydrate of a metal salt of the acid are used before, during or after the neutralization.

2. The process of claim 1, wherein the polyether polyol has a molecular weight of about 2500 or less.

3. The process of claim 1, wherein in step (b) an aqueous acid solution is used which comprises at least about 50% by weight of acid having a pKa of less than about 5.

4. The process of claim 1, further comprising reducing the water content in the reaction mixture prior to the removing step.

5. The process of claim 1, wherein the water content is reduced to about 0.2% by weight or less based on total weight of polyether polyol.

6. The process of claim 1, wherein the salt crystals present in the polyether polyol are removed by filtration.

* * * * *